(12) United States Patent
Teruuchi

(10) Patent No.: US 10,958,866 B2
(45) Date of Patent: Mar. 23, 2021

(54) RECORDING APPARATUS, RECORDING METHOD, AND A NON-TRANSITORY COMPUTER READABLE MEDIUM

(71) Applicant: JVCKENWOOD Corporation, Kanagawa (JP)

(72) Inventor: Takuji Teruuchi, Yokohama (JP)

(73) Assignee: JVCKENWOOD Corporation, Kanagawa (JP)

( * ) Notice: Subject to any disclaimer, the term of this patent is extended or adjusted under 35 U.S.C. 154(b) by 0 days.

(21) Appl. No.: 16/856,786

(22) Filed: Apr. 23, 2020

(65) Prior Publication Data

US 2020/0252577 A1 Aug. 6, 2020

Related U.S. Application Data

(63) Continuation of application No. PCT/JP2019/006213, filed on Feb. 20, 2019.

(30) Foreign Application Priority Data

May 10, 2018 (JP) .............................. JP2018-091198
Jan. 25, 2019 (JP) .............................. JP2019-011024

(51) Int. Cl.
*H04N 5/77* (2006.01)
*G07C 5/02* (2006.01)
(Continued)

(52) U.S. Cl.
CPC ................. *H04N 5/77* (2013.01); *G07C 5/02* (2013.01); *G11B 27/34* (2013.01); *H04N 7/188* (2013.01)

(58) Field of Classification Search
CPC .......... G07C 5/02; G07C 5/0866; H04N 5/77; H04N 7/183; H04N 7/188; G11B 27/031; G11B 27/34
(Continued)

(56) References Cited

U.S. PATENT DOCUMENTS

2010/0171829 A1 7/2010 Yago et al.
2014/0002651 A1\* 1/2014 Plante ....................... G08G 1/20
348/148

(Continued)

FOREIGN PATENT DOCUMENTS

CN 105046951 A 11/2015
JP 2009-087007 A 4/2009

*Primary Examiner* — Thai Q Tran
*Assistant Examiner* — Stephen R Smith
(74) *Attorney, Agent, or Firm* — Procopio, Cory, Hargreaves & Savitch LLP

(57) ABSTRACT

A recording apparatus includes a photographed data acquisition unit that acquires photographed data of surroundings of a vehicle, an event detection unit that determines, when acceleration of a first threshold or greater applied to the vehicle is detected, that a first level event has occurred, while when acceleration of a second threshold or greater is detected, determine that a second level event has occurred, in which the second threshold is greater than the first threshold, and a recording control unit that, in the detection of the first level event, stores the photographed data as first level event data, while in the detection of the second level event, stores the photographed data as second level event data, and when the first level event data is reproduced within a first period from the occurrence of the first level event, stores the first level event data as the second level event data.

9 Claims, 8 Drawing Sheets

(51) Int. Cl.
*G11B 27/34* (2006.01)
*H04N 7/18* (2006.01)

(58) Field of Classification Search
USPC ...... 386/228; 340/438, 439, 441; 455/414.1; 701/1, 32.2
See application file for complete search history.

(56) References Cited

U.S. PATENT DOCUMENTS

| | | | |
|---|---|---|---|
| 2015/0112542 A1* | 4/2015 | Fuglewicz | G07C 5/0816 |
| | | | 701/32.2 |
| 2017/0053461 A1* | 2/2017 | Pal | G06N 7/005 |
| 2017/0262728 A1* | 9/2017 | Kozuka | G06T 11/60 |
| 2017/0263120 A1* | 9/2017 | Durie, Jr. | G08G 1/205 |
| 2018/0007323 A1* | 1/2018 | Botusescu | H04N 5/783 |
| 2018/0075309 A1* | 3/2018 | Sathyanarayana | H04N 5/247 |
| 2018/0189989 A1* | 7/2018 | Douglas | A43B 3/0005 |
| 2018/0215344 A1* | 8/2018 | Santora | B60R 25/32 |
| 2018/0341706 A1* | 11/2018 | Agrawal | G06F 16/73 |
| 2018/0357484 A1* | 12/2018 | Omata | G06K 9/00818 |
| 2019/0068925 A1* | 2/2019 | Imomoto | G06K 9/00845 |
| 2019/0287319 A1* | 9/2019 | Golov | H03M 7/70 |

* cited by examiner

RECORDING APPARATUS, RECORDING METHOD, AND A NON-TRANSITORY COMPUTER READABLE MEDIUM

CROSS REFERENCE TO RELATED APPLICATION

This application is a Bypass Continuation of PCT/JP2019/006213 filed on Feb. 20, 2019, which is based upon and claims the benefit of priorities from Japanese patent application No. 2018-091198, filed on May 10, 2018, and Japanese patent application No. 2019-011024, filed on Jan. 25, 2019, the disclosure of which is incorporated herein in its entirety by reference.

BACKGROUND

The present disclosure relates to a recording apparatus, a recording method, and a program. More specifically, the present disclosure relates to a recording apparatus, a recording method, and a program that appropriately record an accident of a moving body such as an automobile.

Dashboard cameras that detect an impact on a vehicle and store a video for a predetermined period before and after the time when the impact is detected as event data in such a way that the event data will not be overwritten have become widespread. For example, Patent Literature 1 (Japanese Unexamined Patent Application Publication No. 2009-087007) discloses a dashboard camera that records video data based on a change in acceleration.

SUMMARY

Many dashboard cameras such as the above dashboard camera disclosed in Patent Literature 1 set a value of acceleration detected as an event so that a vibration caused by usual traveling of a vehicle and acceleration during a braking operation will not be detected as an event. Such a dashboard camera includes a function for manually generating event data when it is desired to manually generate event data such as for an accident with acceleration smaller than acceleration detected as an event or for other reasons.

However, when an accident with acceleration smaller than the acceleration detected as an event occurs, it may be difficult for a user of the dashboard camera to manually record an event promptly if he/she is not familiar with the function of the dashboard camera or if he/she is upset with the accident.

A recording apparatus according to this embodiment includes: a photographed data acquisition unit configured to acquire photographed data taken by a camera for photographing surroundings of a moving body; an event detection unit configured to, when acceleration greater than or equal to a first threshold and less than a second threshold, the second threshold being greater than the first threshold, applied to the moving body is detected, determine that a first level event has occurred, while when acceleration greater than or equal to the second threshold is detected, determine that a second level event has occurred; and a recording control unit configured to, when an occurrence of the first level event is detected, store the photographed data resulting from the occurrence of the first level event data as first level event data, while when an occurrence of the second level event is detected, store the photographed data resulting from the occurrence of the second level event as second level event data, and when the first level event data is reproduced within a first period from the occurrence of the first level event, store the first level event data as the second level event data.

A recording method according to this embodiment includes: acquiring photographed data taken by a camera for photographing surroundings of a moving body; determining, when acceleration greater than or equal to a first threshold and less than a second threshold, the second threshold being greater than the first threshold, applied to the moving body is detected, that a first level event has occurred, while when acceleration greater than or equal to the second threshold is detected, determining that a second level event has occurred; and storing, when an occurrence of the first level event is detected, the photographed data resulting from the occurrence of the first level event data as first level event data, while when an occurrence of the second level event is detected, storing the photographed data resulting from the occurrence of the second level event as second level event data, and when the first level event data is reproduced within a predetermined period from the occurrence of the first level event, storing the first level event data as the second level event data.

A program according to this embodiment for causing a computer operating as a recording apparatus to execute: acquiring photographed data taken by a camera for photographing surroundings of a moving body; determining, when acceleration greater than or equal to a first threshold and less than a second threshold, the second threshold being greater than the first threshold, applied to the moving body is detected, that a first level event has occurred, while when acceleration greater than or equal to the second threshold is detected, determining that a second level event has occurred; and storing, when an occurrence of the first level event is detected, the photographed data resulting from the occurrence of the first level event data as first level event data, while when an occurrence of the second level event is detected, storing the photographed data resulting from the occurrence of the second level event as second level event data, and when the first level event data is reproduced within a predetermined period from the occurrence of the first level event, storing the first level event data as the second level event data.

DETAILED DESCRIPTION

Hereinafter, a first embodiment of the present disclosure will be described with reference to the drawings. In the following description of each embodiment, although an example of a dashboard camera used in an automobile that is a moving body will be described as an example of a recording apparatus, the present disclosure is not limited to this. For example, the present disclosure can be applied to various moving bodies such as various vehicle including motorcycles and bicycles, railway vehicles, ships, robots, and even people. Further, the present disclosure is not limited to the following embodiments.

Figure 1:
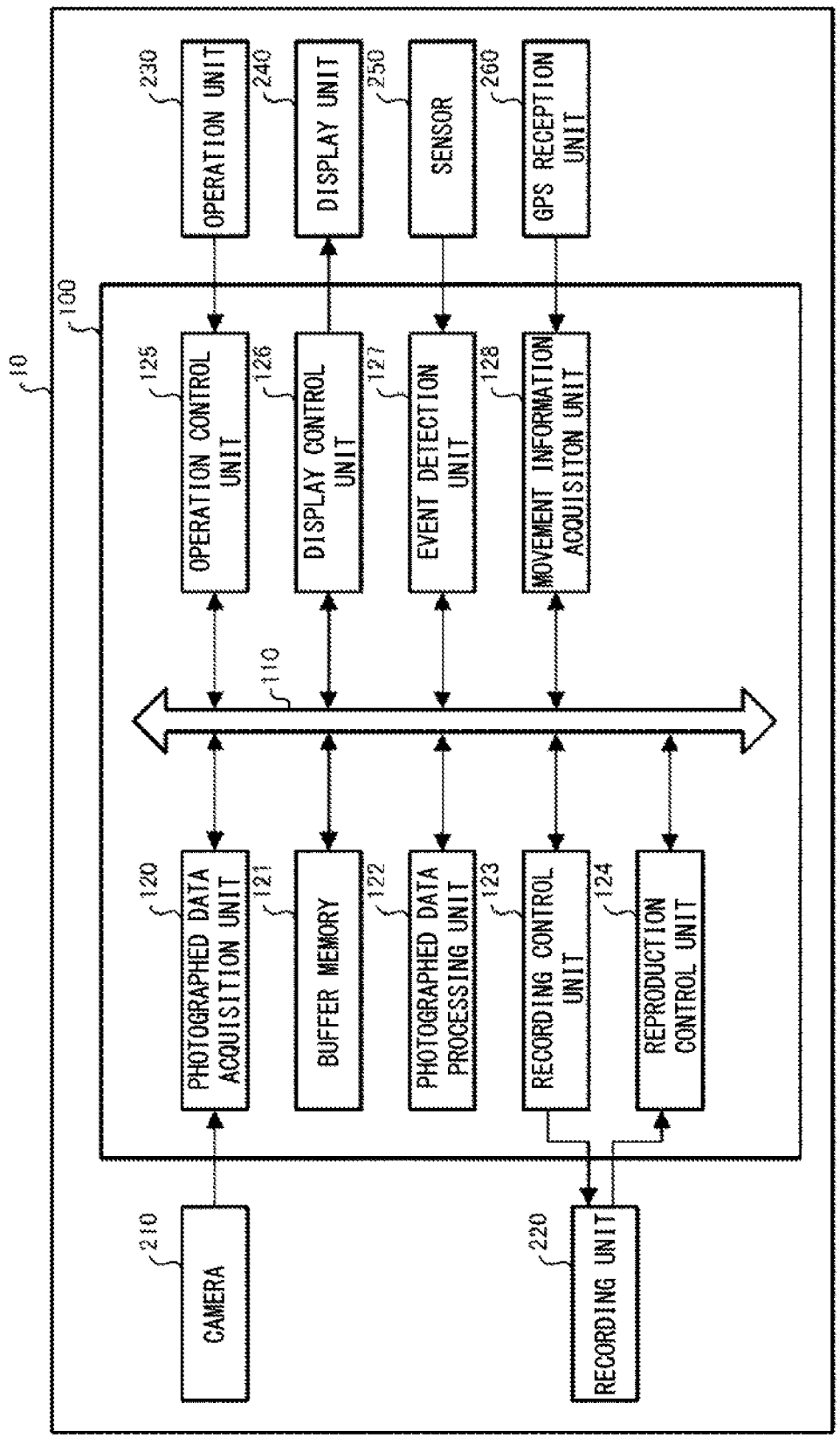
FIG. 1 is a block diagram showing a configuration of a recording apparatus according to a first embodiment of the present disclosure.

FIG. 1 is a block diagram showing a configuration of a recording apparatus 10 according to the first embodiment of the present disclosure. The recording apparatus 10 is mounted as a dashboard camera on an upper part of a windshield of a vehicle so as to face the front of the vehicle. The recording apparatus 10 detects an impact corresponding to an accident, and stores photographed data for a period including a time of an occurrence of the accident. The recording apparatus 10 as a dashboard camera is not limited to a single apparatus mounted on a vehicle and instead may have, for example, a configuration implemented as a function of a navigation apparatus and a configuration mounted in advance on a vehicle. Since the recording apparatus 10 according to the present disclosure also has a function of reproducing recorded data, the recording apparatus 10 may also be referred to as a recording and reproducing apparatus.

The recording apparatus 10 may be mounted to face the rear or side of the vehicle. Further, the recording apparatus 10 may photograph the inside of the vehicle. The recording apparatus 10 may be an integrated apparatus or may be implemented by a plurality of separate apparatuses.

In FIG. 1, the recording apparatus 10 includes a control unit 100 as a recording control apparatus, a camera 210, a recording unit 220, an operation unit 230, a display unit 240, a sensor 250, and a GPS reception unit 260.

The control unit 100 includes one or a plurality of CPUs (Central Processing Units) for performing various data processing, a GPU (Graphics Processing Unit), a buffer memory 121, and so on and executes various processing in accordance with a program. The control unit 100 at least includes, as its configuration and functions, a bus line 110, a photographed data acquisition unit 120, a photographed data processing unit 122, a recording control unit 123, a reproduction control unit 124, an operation control unit 125, a display control unit 126, an event detection unit 127, and a movement information acquisition unit 128. Hereinafter, each component of the control unit 100 will be described assuming that it transmits and receives data such as photographed data via the bus line 110.

The control unit 100 is a recording control apparatus that executes operations according to the present disclosure in the recording apparatus 10 and executes a recording method according to the present disclosure. The control unit 100 is a computer that runs a program according to the present disclosure.

The camera 210 photographs the surroundings, for example, the front or rear, of the vehicle that is the moving body. The camera 210 may be integrally provided as the recording apparatus 10 or may be configured as a separate body connected in a wired or wireless manner. Further, a unit including the camera 210 and the taken photographed data acquisition unit 120 may be provided as a separate body connected in a wired or wireless manner. The camera 210 includes a lens, an image sensor, an A-D (Analog to Digital) conversion element, and so on, which are not shown. The camera 210 outputs the taken photographed data to the image data acquisition unit 120.

In FIG. 1, the camera 210 is shown as a single camera and instead may be composed of a plurality of cameras. For example, the camera 210 may be a plurality of cameras in any combination that each photographs, for example, the front, rear, side, and inside of the vehicle.

The photographed data taken by the camera 210 is moving image data. The photographed data may include audio data in addition to the moving image data. In this case, the camera 210 includes a microphone (not shown) in its configuration.

The recording unit 220 is a non-volatile memory for recording the photographed data such as event data taken by the camera 210 under control of the recording control unit 123. The recording unit 220 is, for example, a memory card. The photographed data such as event data recorded in the recording unit 220 is reproduced under control of the reproduction control unit 124. The recording unit 220 may be replaced with a recording apparatus that includes the recording control unit 123 and the reproduction control unit 124 in addition to the recording unit 220. The recording unit 220 may be integrally provided as the recording apparatus 10 or may be configured as a separate body connected in a wired or wireless manner.

The operation unit 230 is an interface that receives an operation on the recording apparatus 10 and outputs received operation information to the operation control unit 125. The operation unit 230 includes various buttons and a touch panel, and receives operations by a user. The operation unit 230 may receive an operation from another apparatus connected wirelessly. The operation unit 230 receives, for example, an operation to start recording an event from the user. The operation unit 230 also receives an operation for reproducing the event data from the user.

The display unit 240 is a display apparatus that displays various types of information under control of the display control unit 126. The display unit 240 includes a display panel such as a liquid crystal panel or an organic EL panel. The display unit 240 may be integrally provided as the recording apparatus 10 or may be configured as a separate body connected in a wired or wireless manner. The display unit 240 may be another apparatus that is connected wirelessly and includes the display control unit 126.

The sensor 250 is, for example, an acceleration sensor, and detects acceleration applied to the recording apparatus 10 or the vehicle. The sensor 250 is, for example, a three-axis acceleration sensor, and detects acceleration applied in a forward and backward direction of the vehicle as an x-axis direction, a right and left direction of the vehicle as a y-axis direction, and an up and down direction of the vehicle as a z-axis direction. The sensor 250 outputs detected acceleration information to the event detection unit 127. The sensor 250 may be integrally provided as the recording apparatus 10 or may be configured as a separate body connected in a wired or wireless manner. Moreover, the sensor 250 may be a separate body including the sensor 250 and the event detection unit 127.

The GPS reception unit 260 is a GPS antenna that receives signals from GPS satellites. The GPS reception unit 260 outputs the received signal to the movement information acquisition unit 128. The GPS reception unit 260 may be provided integrally as the recording apparatus 10 or may be configured as a separate body connected in a wired or wireless manner. Further, the GPS acquisition unit 260 may be a separate body as another apparatus including the GPS acquisition unit 260 and the movement information acquisition unit 128.

The photographed data acquisition unit 120 acquires the photographed data taken by the camera 210. The photographed data acquisition unit 120 outputs the photographed data acquired from the camera 210 to the buffer memory 121.

The buffer memory 121 is an internal memory included in the control unit 100 and temporarily stores the photographed data for a certain time acquired by the photographed data acquisition unit 120 while updating the photographed data.

The photographed data processing unit 122 converts the photographed data temporarily stored in the buffer memory 121 into a specified file format such as the MP4 format which has been encoded by a codec of a specified scheme, for example, H.264 and MPEG-4 (Moving Picture Experts Group). The photographed data processing unit 122 generates the photographed data as a file for the certain time from the photographed data temporarily stored in the buffer memory 121. As a specific example, the photographed data processing unit 122 generates the photographed data temporarily stored in the buffer memory 121 as a file of 60 seconds in the order of the recording. The photographed data processing unit 122 outputs the generated photographed data to the recording control unit 123. Further, the photographed data processing unit 122 outputs the generated photographed data to the display control unit 126. The period of the photographed data generated as a file is 60 seconds as an example, but the period is not limited to this.

The recording control unit 123 controls the recording unit 220 to record the photographed data filed by the photographed data processing unit 122. During a period when the event detection unit 127 does not detect an event, the recording control unit 123 records the photographed data filed by the photographed data processing unit 122 in the recording unit 220 as write-unprotected photographed data. When the recording capacity of the recording unit 220 reaches an upper limit, the recording control unit 123 starts recording new photographed data in a recording area where old photographed data is recorded in the recording unit 220 by overwriting the old write-unprotected photographed data.

In response to the event detection unit 127 determining that an event has occurred, the recording control unit 123 stores the photographed data for a predetermined period including a time of an occurrence of the event as event data for which writing is protected. In response to the event detection unit 127 determining that a first level event, which will be described later, has occurred, the recording control unit 123 stores the photographed data for a predetermined period resulting from an occurrence of the first level event as first level event data for which writing is protected. In response to the event detection unit 127 determining that a second level event, which will be described later, has occurred, the recording control unit 123 stores the photographed data for a predetermined period resulting from an occurrence of the second level event as second level event data for which writing is protected.

As the event data resulting from the occurrence of the first level event, the recording control unit 123 stores the photographed data including an event detection time in the photographed data for a predetermined period before and after the event detection time as the first level event data. An example of the predetermined period is 30 seconds before and after the event detection time. As the event data resulting from the occurrence of the first level event, the recording control unit 123 may store the photographed data for a predetermined period after the event is detected in the photographed data as the first level event data. An example of the predetermined period in this case is 30 seconds after the event is detected.

As the event data resulting from the occurrence of the second level event, the recording control unit 123 stores the photographed data including an event detection time in the photographed data for a predetermined period before and after the event detection time as the second level event data. An example of the predetermined period is 30 seconds before and after the event detection time. As the event data resulting from the occurrence of the second level event, the recording control unit 123 may store the photographed data for a predetermined period after the event is detected in the photographed data as the second level event data. An example of the predetermined period in this case is 30 seconds after the event is detected.

The recording control unit 123 stores, in the recording unit 220, the first level event data that is the photographed data resulting from the occurrence of the first level event as write-protected data that can be changed to write-unprotected data. Specifically, a write-protected flag is provided to the first level event data and the first level event data is stored in a manner similar to write-unprotected photographed data. The write-protected flag can be canceled under control of the recording control unit 123. The first level event data for which the write-protected flag is canceled can be overwritten from the time when the write-protected flag is canceled.

The recording control unit 123 stores the second level event data that is the photographed data resulting from the occurrence of the second level event in the write-protected area of the recording unit 220. The recording control unit 123 may transmit the second level event data to another apparatus and stores the second level event data in the other apparatus so that the second level event data will not be overwritten.

The reproduction control unit 124 performs control for reproducing the photographed data recorded in the recording unit 220. The reproduction control unit 124 can reproduce the first level event data and the second level event data in addition to the write-unprotected photographed data recorded in the recording unit 220. The reproduction control unit 124 reproduces various data to be reproduced based on a selection operation of a file to be reproduced, a reproduction start operation, and the like on the operation unit 125 acquired by the operation control unit 125, and outputs the data to the display control unit 126.

When the first level event data stored based on the occurrence of the first level event is reproduced within a first period from the occurrence of the first level event, which has triggered the event data to be stored as the first level event data, the reproduction control unit 124 outputs information indicating that the first level event data is reproduced to the recording control unit 123.

The operation control unit 125 acquires the operation information received by the operation unit 230 and outputs an operation instruction based on the operation information to each component. When the operation control unit 125 acquires an instruction to select various data to be reproduced from the operation unit 230, the operation control unit 125 controls the reproduction control unit 124 to select a file and the like recorded in the recording unit 220. When the operation control unit 125 acquires an instruction regarding reproduction of various data from the operation unit 230, the operation control unit 125 controls the reproduction control unit 124 to perform processing related to reproduction. Examples of the instruction related to the reproduction of various data includes a reproduction start, a pause, a reproduction stop, and an enlarged display.

The event detection unit 127 acquires acceleration information detected by the sensor 250, which is an acceleration sensor, and determines that an event is detected when acceleration corresponding to an event is detected. When it is determined that an event is detected, the event detection unit 127 outputs information about the event detection to the recording control unit 123.

When the acceleration output from the sensor 250 is greater than or equal to a first threshold and less than a second threshold, which is greater than the first threshold, the event detection unit 127 determines that a first level event has occurred. When the acceleration output from the sensor 250 is greater than or equal to the second threshold, which is greater than the first threshold, the event detection unit 127 determines that a second level event has occurred. The first threshold is, for example, 0.2 G, and the second threshold is, for example, 0.5 G, but the first and second thresholds are not limited to these numerical values. As the second threshold, such acceleration that makes it possible to clearly determine that the acceleration caused by a collision between vehicles or a traveling vehicle and an object is because of an accident is set. The first threshold is a value smaller than the second threshold, and such acceleration that cannot be clearly determined that the acceleration is caused by an accident from the acceleration alone. The event detection unit 127 may determine that an event has occurred when the acceleration sharply increases and exceeds the first threshold or the second threshold. This is because, for example, the acceleration caused by sudden acceleration or sudden braking of a vehicle that is a moving body will not be determined as an occurrence of an event, and instead acceleration with a sharp rise that occurs when a vehicle collides with an object will be determined as an occurrence of an event.

The event detection unit 127 determines a relationship between the detected acceleration and the first threshold and the second threshold based on an absolute value of a peak acceleration value output from the sensor 250.

When the sensor 250 is a three-axis acceleration sensor, the event detection unit 127 may acquire acceleration information for each axis detected by the acceleration sensor. The event detection unit 127 acquires the acceleration information applied in the x-axis direction, which is the forward and backward direction of the vehicle that is the moving body, the acceleration information applied in the y-axis direction, which is the right and left direction of the vehicle, and the acceleration information applied in the z-axis direction, which is the up and down direction of the vehicle. The acceleration applied in the z-axis direction is acceleration applied other than gravitational acceleration.

The event detection unit 127 may determine that a first level event has occurred when, regarding the acceleration detected by the sensor 250, the acceleration applied in the horizontal direction of the vehicle configured by the x-axis and the y-axis is greater than or equal to the first threshold. In this case, even when the acceleration applied in the z-axis direction is greater than or equal to the first threshold, if the acceleration applied in the horizontal direction is less than the first threshold, it is not determined that a first level event has occurred.

Further, the event detection unit 127 determines that a second level event has occurred when, regarding the acceleration detected by the sensor 250, the acceleration applied in at least one of the x-axis, the y-axis, and the z-axis is greater than or equal to the first threshold.

The movement information acquisition unit 128 identifies a current location at each time based on the signal from the GPS satellite received by the GPS reception unit 260, and outputs current location information at each time to the recording control unit 123. The movement information acquisition unit 128 identifies latitude and longitude as the current location information. The movement information acquisition unit 128 may receive a radio wave such as Wi-Fi (registered trademark) in addition to the signal from the GPS reception unit 260, and may identify the current location using location information and the like of a base station, too.

Figure 2:
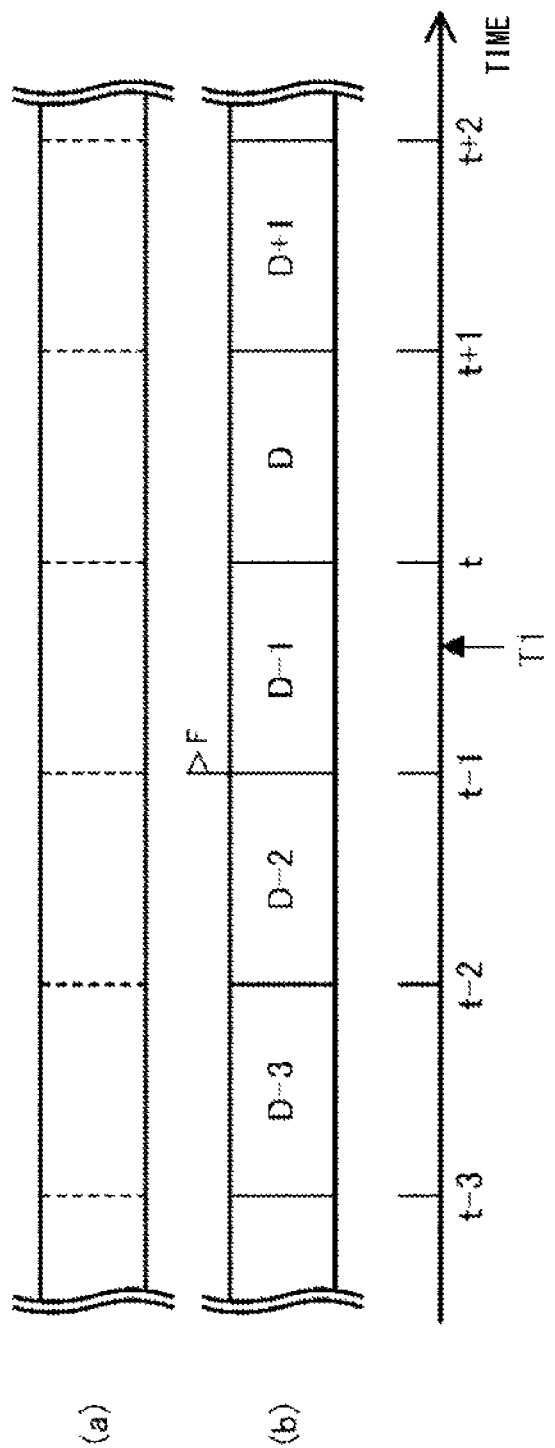
FIG. 2 conceptually shows a relationship between photographed data and event data according to the first embodiment of the present disclosure.

Next, recording processing when an occurrence of a first level event is detected will be described with reference to FIG. 2. FIG. 2 conceptually shows a relationship between the photographed data and the event data. The horizontal axis in FIG. 2 represents the time elapsed, indicating that the time elapses in the right direction.

In FIG. 2, (a) shows the photographed data acquired by the photographed data acquisition unit 120 from the camera 210 and temporarily stored in the buffer memory 121. The dotted lines in (a) of FIG. 2 correspond to the time t−3 to the time t+2, which are shown on the time axis, and indicate a period for the photographed data processing unit 122 to generate a file. In the state where the photographed data is temporarily stored in the buffer memory 121, no file is generated, and thus the photographed data is indicated by the broken lines.

In FIG. 2, (b) shows the photographed data that the photographed data processing unit 122 converted the photographed data temporarily stored in the buffer memory 121 into files and that is recorded by the recording control unit 123 in the recording unit 220. For example, photographed data D-3 is taken between the time t−3 and the time t−2, and is recorded in the recording unit 220 as a file in a state in which the photographed data D-3 can be overwritten. Likewise, photographed data D-2 is taken between the time t−2 and the time t−1, and is recorded in the recording unit 220 as a file in a state in which the photographed data D-2 can be overwritten.

A case where the event detection unit 127 detects a first level event at the time T1 between the time t−1 and the time t will be described. In this case, photographed data taken between the time t−1 and the time t is filed as photographed data D-1. Then, a write-protected flag F is provided to a header, payload, or the like of the photographed data D-1 so that the photographed data D-1 will not be overwritten, and then the photographed data D1 is recorded in the recording unit 220.

For example, when the recording capacity of the recording unit 220 reaches the upper limit, in the photographed data shown in (b) of FIG. 2, photographed data before the photographed data D-3 is overwritten, and then the photographed data D-3 is overwritten, and after that, the photographed data D-2 is overwritten. Since the write-protected flag is provided to the photographed data D-1, the photographed data D is not overwritten until the write-protected flag F is canceled, and the photographed data D is overwritten after the photographed data D-2 is overwritten.

The photographed data D-1 in which photographed data for a period from the time t−1 to the time t being filed includes the time T1, which is the event detection time. The photographed data D-1 is first level event data. The first level event data is not limited to the photographed data for the period generated as a file including the event detection time. For example, the photographed data for a period from a predetermined time before the time T1, which is the event detection time, till after a predetermined time elapses from the time T1 may be stored as the first level event data. The predetermined time is, for example, from 30 seconds before the time T1, which is the event detection time, till 30 seconds after the time T1, but is not limited to this. Further, for example, recording of the first level event data may be started from T1, which is the event detection time, and the photographed data for a period from T1 until a predetermined time elapses from the time T1 may be stored as the first level event data. The predetermined time is, for example, 30 seconds from the time T1 that is the event detection time, but is not limited to this.

Figure 3:
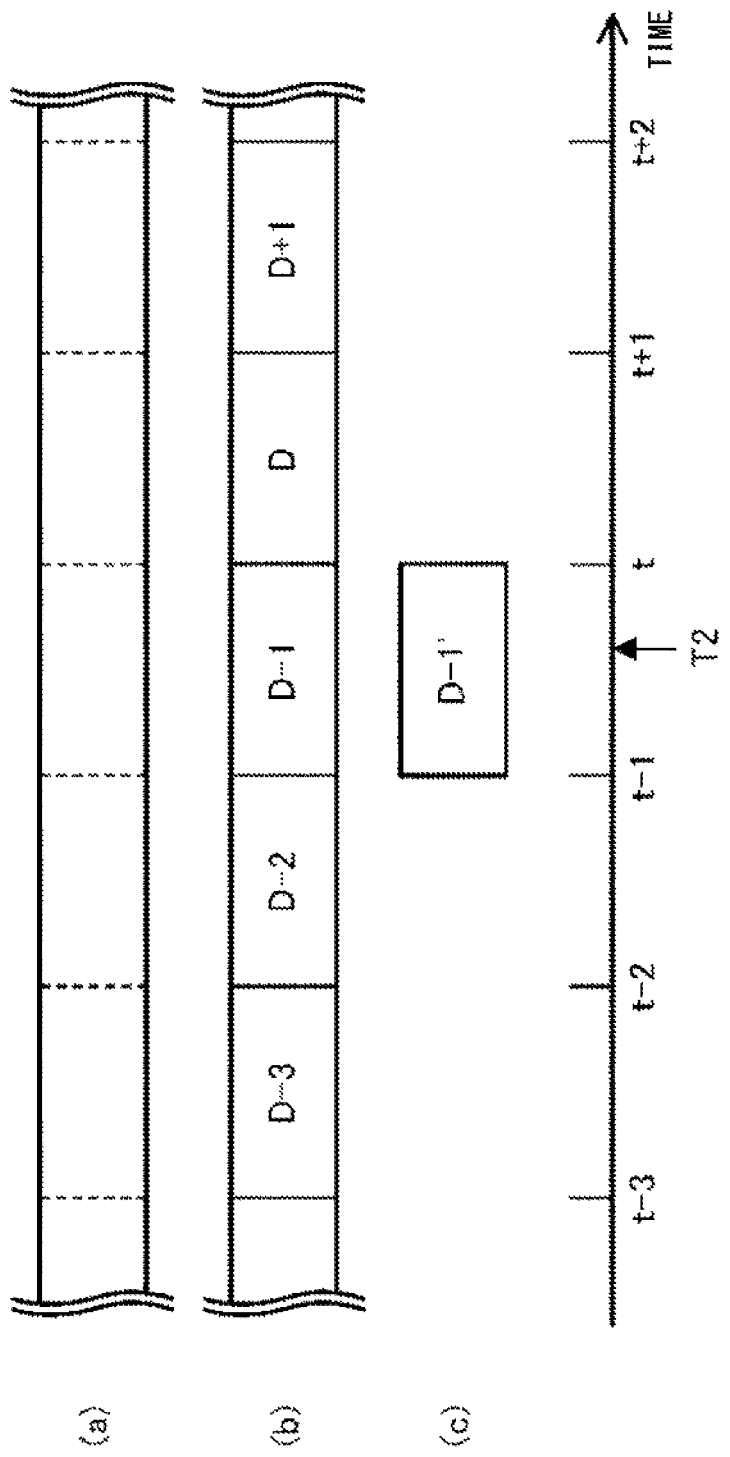
FIG. 3 is conceptually shows a relationship between photographed data and event data according to the first embodiment of the present disclosure.

Next, recording processing when an occurrence of a second level event is detected will be described with reference to FIG. 3. FIG. 3 conceptually shows a relationship between the photographed data and the event data. The horizontal axis in FIG. 3 represents the time elapsed, indicating that the time elapses in the right direction.

Like (a) in FIG. 2, in FIG. 3, (a) shows the photographed data acquired by the photographed data acquisition unit 120 from the camera 210 and temporarily stored in the buffer memory 121. Like (b) in FIG. 2, in FIG. 3, (b) shows the photographed data that the photographed data processing unit 122 converted the photographed data temporarily stored in the buffer memory 121 into files and that is recorded by the recording control unit 123 in the recording unit 220.

A case where the event detection unit 127 detects a second level event at the time T2 between the time t−1 and the time t will be described. In this case, photographed data taken between the time t−1 and time t is filed as photographed data D-1 and recorded in the recording unit 220. At this time, the recording control unit 123 stores the photographed data D-1 as photographed data D-1' in the write-protected area of the recording unit 220.

For example, when the recording capacity of the recording unit 220 reaches the upper limit, in the photographed data shown in (b) in FIG. 3, the photographed data D-1 is overwritten after the photographed data D-2 is overwritten. However, since the photographed data D-1 is stored as the photographed data D-1' in the write-protected area of the recording unit 220 shown in (c) in FIG. 3, the photographed data D-1 is reliably stored.

The photographed data D-1' in which the photographed data for the period from the time t−1 to the time t is filed and stored in the write-protected area of the recording unit 220 includes the time T2, which is the event occurrence time. The photographed data D'1 is second level event data. The second level event data is not limited to photographed data generated as a file for the period including the event occurrence time. For example, the photographed data for a period from a predetermined time before the time T2, which is the event occurrence time, till after a predetermined time elapses from the time T2 may be stored as the second level event data. The predetermined time is, for example, 30 seconds, but is not limited to this. Further, for example, recording of the second level event data may be started from T2, which is the event detection time, and the photographed data for a period from T2 until a predetermined time elapses from the time T2 may be stored as the second level event data. The predetermined time is, for example, 30 seconds from the time T1 that is the event detection time, but is not limited to this.

Further, the storage of the second level event data is not limited to the storage in the write-protected area of the recording unit 220. For example, the second level event data may be recorded in a recording unit included in a previously-registered another apparatus using a communication function (not shown). As a specific example, the second level event data may be transmitted to a mobile terminal such as a smartphone owned by a driver or a passenger, the mobile terminal having previously been paired with the recording apparatus 10 and established communication with the recording apparatus 10. Alternatively, the second level event data may be transmitted to the driver and related parties of the driver previously registered in the recording apparatus 10 and further to apparatuses such as a server owned by insurance companies and security companies, which have been previously registered in the recording apparatus 10.

The above-described photographed data including the rewritable photographed data, the first level event data, and the second level event data is preferably recorded in association with the location information acquired by the movement information acquisition unit 128.

Next, a flow of recording processing executed by the recording apparatus 10 will be described with reference to FIG. 4. The recording processing executed by the recording apparatus 10 is executed based on a program by the control unit 100 as a computer operating as the recording apparatus. The functions of the control unit 100 may be divided and executed by control apparatuses included in a plurality of apparatuses or units. In such a case, the program is also executed in cooperation with each apparatus or each unit.

Figure 4:
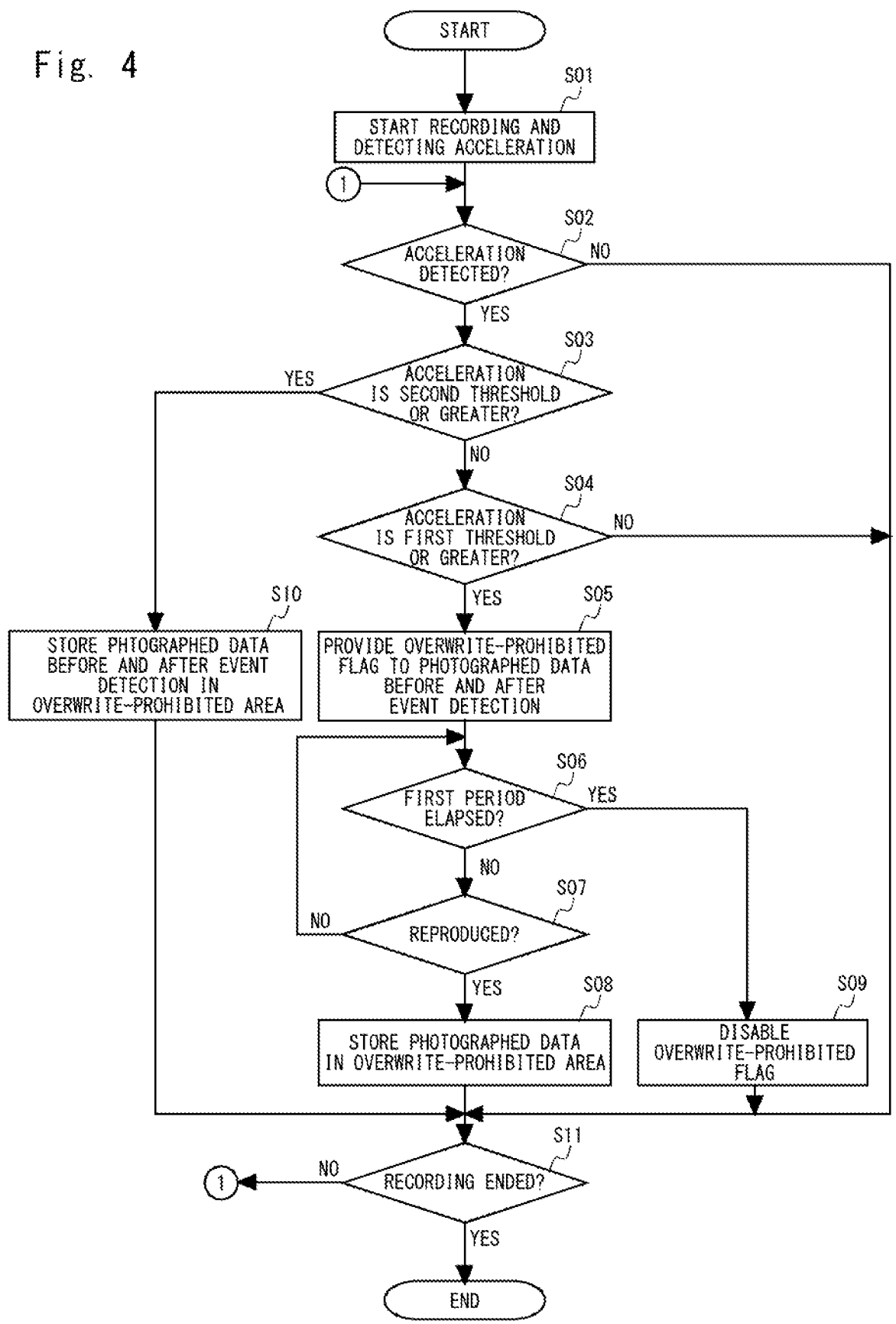
FIG. 4 is a flowchart showing a processing example of the recording apparatus according to the first embodiment of the present disclosure.

In FIG. 4, the start of processing means that, for example, the recording apparatus 10 can be operated by turning on an engine or a power supply of a vehicle that is a moving body. The processing may be started by instructing the operation unit 230 to start the recording processing.

At the time of starting the processing, the recording apparatus 10 starts recording the photographed data and detecting acceleration (Step S01). The start of the recording of photographed data in Step S01 means starting to acquire the photographed data from the camera 210 by the photographed data acquisition unit 120, file the photographed data by the photographed data processing unit 122, and record the photographed data in the recording unit by the recording control unit 123. The photographed data in this case is recorded in the recording unit 220 in a state where the photographed data can be overwritten and is also referred to as normal recording or loop recording. Further, the start of the detecting of the acceleration in Step S01 means the event detection unit 128 starting to acquire the acceleration information from the sensor 250.

Further, while each processing shown in FIG. 4 is being executed, the recording of the photographed data, the detection of an event by acquiring the acceleration information, and the identification of the current location information by the movement information acquisition unit 128 are continuously executed.

In Step S01, after the recording of the photographed data and the detection of acceleration are started, the event detection unit 127 determines whether the acceleration is detected by the sensor 250 (Step S02).

In Step S01, accelerations of various conditions is applied to the vehicle that is a moving body caused by vibrations of the engine, passengers getting on and off the vehicle, loading and unloading of luggage, vibrations and acceleration/deceleration during traveling, and the like. Thus, when all the accelerations is to be detected, there are few cases where Step S02 is determined to be No. For this reason, in the determination of Step S02, filtering may be performed so that acceleration corresponding to a collision of an object with the vehicle is detected regardless of the magnitude of the absolute value of the acceleration. For example, in Step S02, the event detection unit 127 may detect all acceleration applied to the vehicle. For example, the event detection unit 127 may detect acceleration of a predetermined value or greater, which is acceleration indicating a sharp rise corresponding to a collision of an object with the vehicle.

When the event detection unit 127 determines in Step S02 that the acceleration is detected (Step S02: Yes), the event detection unit 127 determines whether the magnitude of the detected acceleration is greater than or equal to the second threshold (Step S03). Specifically, the event detection unit 127 determines whether the maximum value as the absolute value of the detected acceleration exceeds 0.5 G, at which the event detection unit 127 can determine that a second level event has occurred. When the acceleration sensor is a three-axis acceleration sensor, regarding the maximum value as the absolute value of the detected acceleration, it may be determined whether acceleration in any of the x-axis direction, the y-axis direction, and the z-axis direction is greater than or equal to the second threshold or it may be determined whether the combined acceleration of any two or three axes is acceleration greater than or equal to the second threshold. As an example of the second threshold, a value that enables a detection of acceleration not applied during normal traveling of a vehicle and instead applied by a collision of an object with the vehicle may be set.

In Step S02, when the event detection unit 127 determines that no acceleration is detected (Step S02: No), the process proceeds to Step S11.

In Step S03, when it is determined that the detected acceleration is greater than or equal to the second threshold (Step S03: Yes), the recording control unit 123 stores the photographed data including the event occurrence time detected in Step S02 as the second level event data (Step S10). For example, as shown in FIG. 3, the recording control unit 123 stores the photographed data including the event occurrence time in the write-protected area of the recording unit 220.

When it is determined in Step S03 that the detected acceleration is not greater than or equal to the second threshold (Step S03: No), the event detection unit 127 determines whether the detected acceleration is greater than or equal to the first threshold (Step S04). Specifically, the event detection unit 127 determines whether the maximum value as the absolute value of the detected acceleration exceeds 0.2 G, at which the event detection unit 127 can determine that a first level event has occurred. When the acceleration sensor is a three-axis acceleration sensor, regarding the maximum value as the absolute value of the detected acceleration, it may be determined whether acceleration in any of the x-axis direction, the y-axis direction, and the z-axis direction is greater than or equal to the first threshold or it may be determined whether the combined acceleration of any two or three axes is acceleration greater than or equal to the first threshold. As an example of the first threshold, a value that enables a detection of acceleration not applied during traveling of a vehicle on a flat road and vibrations of the engine and instead applied due to a minor collision of an object with the vehicle may be set.

In Step S04, when it is determined that the detected acceleration is greater than or equal to the first threshold (Step S04: Yes), the recording control unit 123 stores the photographed data including the event occurrence time detected in Step S02 as the first level event data (Step S05).

For example, the recording control unit 123 provides a write-protected flag to the photographed data including the event occurrence time, as shown in FIG. 2, and stores the photographed data in the recording unit 220 with a write-protected flag.

When it is determined in Step S04 that the detected acceleration is not greater than or equal to the first threshold (Step S04: No), the process proceeds to Step S11.

When the first level event data is stored in Step S05, the recording control unit 123 determines whether the first period has elapsed since the first level event data is stored in Step S05 (Step S06). The first period preferably includes a period from after the occurrence of the first level event to when the parties concerned or related parties of the accident, which is the event, reproduce and confirm the first level event data corresponding to the event. In other words, it can be said that the fact that the first level event data is not reproduced until the first period elapses since the first level event data is stored means that the first level event data does not require reproduction and confirmation, because the first level event data is not caused by an accident. The first period is, for example, 10 minutes.

When the recording control unit 123 determines in Step S06 that the first period has not elapsed (Step S06: No), the recording control unit 123 determines whether the first level event data is reproduced (Step S07). The determination in Step S07 may be made based on the start of the reproduction by the reproduction control unit 124 in response to the operation instruction received by the operation control unit 125, or may be determined based on the operation instruction received by the operation control unit 125.

When the first level event data is stored in Step S05, the display control unit 126 may control the display unit 240 to display an icon indicating whether it is necessary to reproduce the first level event data that is the latest event data. The first level event data may be reproduced by an operation on the icon on the operation unit 230 such as a touch panel. Likewise, when the second level event data is stored in Step S10, the display control unit 126 may control the display unit 240 to display an icon indicating whether it is necessary to reproduce the second level event data that is the latest event data. That is, when an event is detected and event data is recorded, an icon for receiving reproduction of the event data is displayed on the display unit 240, and the latest event data can be reproduced by an operation of the icon.

When it is determined in Step S07 that the first level event data has not been reproduced (Step S07: No), the process proceeds to Step S06. When it is determined in Step S07 that the first level event data is reproduced (Step S07: Yes), the recording control unit 123 stores the photographed data stored as the first level event data in Step S05 as the second level event data (Step S08).

In Step S08, the recording control unit 123 stores the first level event data, which is provided with the write-protected flag and stored in the recording unit 220, in the write-protected area of the recording unit 220 to thereby store the first level event data as the second level event data. Specifically, the first event data is copied and stored in the write-protected area of the recording unit 220. In this case, the write-protected flag of the first level event data, which is copy source event data, is canceled to become write-unprotected photographed data.

When the recording control unit 123 determines in Step S06 that the first period has elapsed (Step S06: Yes), the write-protected flag provided in Step S05 is canceled (Step S09). The cancellation of the write-protected flag is to make the first level event data provided with the write-protected flag write-unprotected by deleting or disabling the write-protected flag F described in FIG. 2.

The case where Step S06 is determined to be Yes means that even when the event detection unit 127 detects a first level event and stores first level event data, there has been no request for reproducing the first level event data. Examples of the case where Step S06 is determined to be Yes include a case where the acceleration caused by factors other than an accident that allows the vehicle to continue operating is detected.

The reason why the processing of Step S09 is performed when Step S06 is determined to be Yes is that many pieces of first level event data not requiring confirmation of the event data are generated by detection of acceleration caused by factors other than an accident, because the first level event data is generated when the first level event data is greater than or equal to the first threshold that is smaller than the second threshold. When such first level event data is accumulated as write-protected data, many pieces of unnecessary event data are stored, thereby consuming the recording capacity of the recording unit 220. The same applies to the first level event data after the first level event data is stored as the second level event data in Step S08.

In each case of, after the first level event data is stored as the second level event data in Step S08, after the write-protected flag of the first level event data is canceled in Step S09, and after the photographed data is stored as the second level event data in step S10, the process proceeds to Step S11.

In Step S11, the control unit 100 determines whether the recording processing is ended. The end of the recording processing in Step S11 is, for example, when the engine or power supply of the vehicle that is a moving body is turned off. Alternatively, the end of the recording processing is a case when the operation unit 230 is instructed to end the recording processing.

When it is determined in Step S11 that the recording processing is not ended (Step S11: No), the process proceeds to Step S02. When it is determined in Step S11 that the recording processing is ended (Step S11: Yes), this process is ended.

In the embodiment described above, a determination of whether the detected event is a first level event or a second level event is made based on magnitude of acceleration detected by the event detection unit 127. The event detection unit 127 may determine whether an event is a first level event or a second level event based on a direction of applied acceleration in addition to the magnitude of the acceleration.

Figure 5:
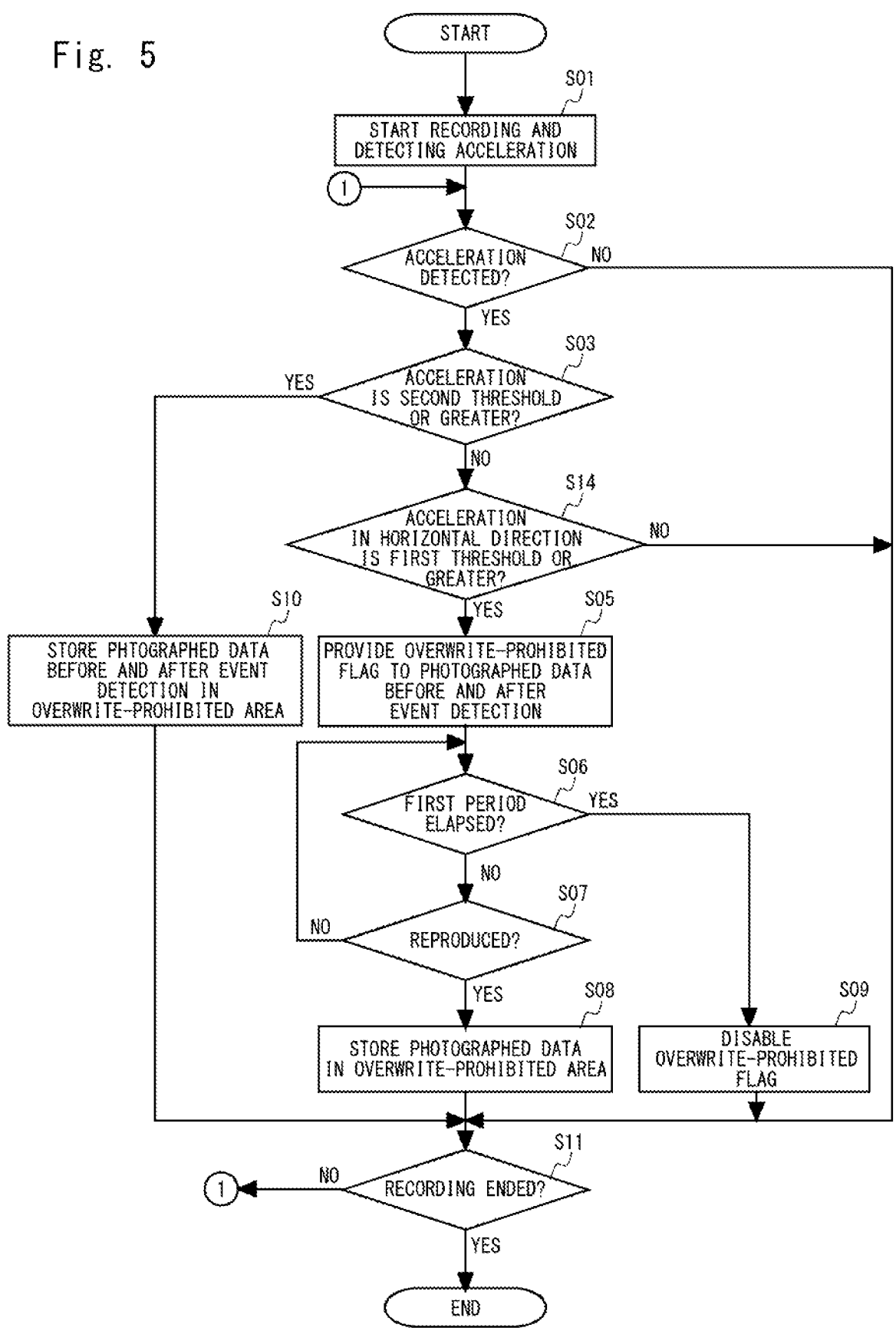
FIG. 5 is a flowchart showing a processing example of a recording apparatus according to a modified example of the first embodiment of the present disclosure.

FIG. 5 is a flowchart showing a modified example of the recording processing executed by the recording apparatus 10. FIG. 5 is processing in which Step S04 in FIG. 4 is replaced with Step S14. Since the processing other than the processing of Step S14 is the same as that of FIG. 4, the description of the same processing is omitted.

It is determined in Step S14 whether the acceleration detected in Step S02 exceeds the first threshold with respect to the horizontal direction in the vehicle configured by the x-axis and the y-axis. In other words, in the determination in Step S14, the event detection unit 127 determines whether the maximum value as the absolute value of the acceleration of the x-axis and y-axis exceeds 0.2 G, at which the event detection unit 127 can determine that a first level event has occurred. When the acceleration sensor is a three-axis acceleration sensor, regarding the maximum value as the absolute value of the detected acceleration, it may be determined whether acceleration in any of the x-axis direction and the y-axis direction is greater than or equal to the second threshold or it may be determined whether the combined acceleration of the x-axis direction and the y-axis direction is acceleration greater than or equal to the second threshold.

In many cases, acceleration greater than or equal to the first threshold is applied to the up and down direction of the vehicle, which is the z-axis direction, for example, while passing over steps during travelling of the vehicle instead of due to a collision. The processing in Step S14 is performed in order to effectively prevent generation of unnecessary first level event data by such acceleration.

In the first embodiment, when the first level event data is recorded, the first level event data reproduced within the first period is event data that the user needs to confirm, and thus this first level event data is stored in a write-protected area as the second level event data. By doing so, even event record data recorded as the first level event data is appropriately stored without being overwritten.

Figure 6:
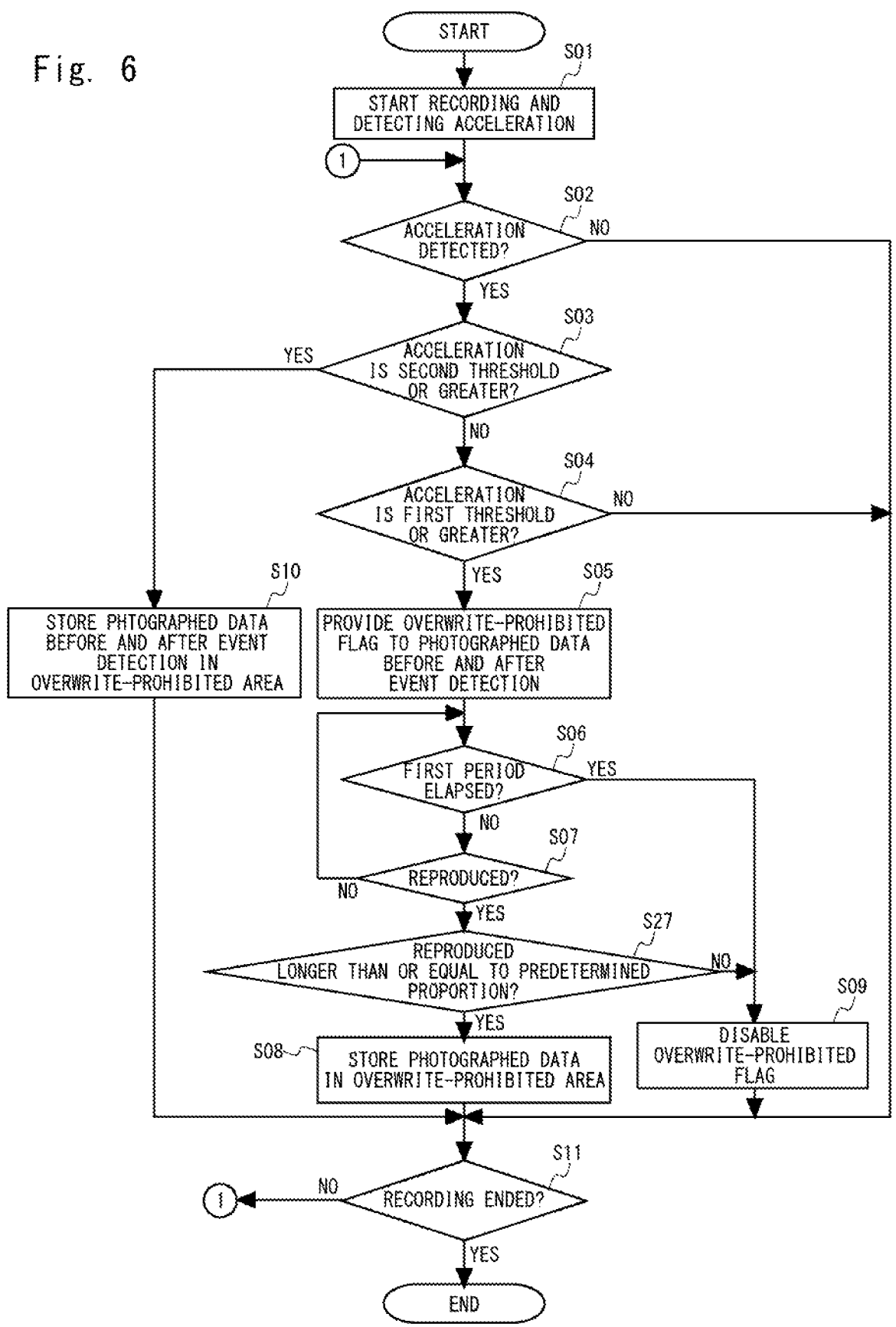
FIG. 6 is a flowchart showing a processing example of a recording apparatus according to a second embodiment of the present disclosure.

Next, a second embodiment of the present disclosure will be described with reference to FIG. 6. A configuration of a recording apparatus 10 according to the second embodiment is the same as that according to the first embodiment, and thus description thereof is omitted. FIG. 6 shows processing in which Step S27 is added between Step S07 and Step S08 in FIG. 4. Since the processing other than the processing of Step S27 is the same as that of FIG. 4, the description of the same processing is omitted.

When it is determined in Step S07 that the first level event data has been reproduced (Step S07: Yes), the recording control unit 123 determines whether a time length the first level event data that has been reproduced in Step S07 is longer than or equal to a predetermined proportion of a time length of the first level event data (Step S27).

For example, the reproduction of the first level event data longer than or equal to the predetermined proportion to be determined in Step S27 means that, for example, when the time length of the first level event data to be reproduced in Step S07 is 60 seconds, the first level event data is reproduced longer than or equal to 45 seconds, which is the predetermined time length, or the first level event data is reproduced longer than or equal to 70%, which is the predetermined proportion, of the entire time length of the first level event data. In other words, the first level event data is reproduced from the beginning and long enough to include an event occurrence time and to enable a confirmation of the state of the event. The determination in Step S27 that the first level event data is not reproduced longer than or equal to the predetermined proportion means that when a stop operation of the reproduction is carried out without reproducing the first level event data longer than or equal to the above predetermined proportion.

When it is determined in Step S27 that the first level event data is not reproduced longer than or equal to the predetermined proportion of the time length of the first level event data (Step S27: No), the process proceeds to Step S09. When it is determined in Step S27 that the first level event data is reproduced longer than or equal to the predetermined proportion of the time length of the first level event data (Step S27: Yes), the process proceeds to Step S08.

In the second embodiment, even when the first level event data is reproduced, if the first level event data is reproduced longer than or equal to the predetermined proportion, it means that this first level event data is highly important for the user. Thus, this first level event data is stored in the write-protected area as the second level event data. By doing so, even event record data recorded as the first level event data is appropriately stored without being overwritten.

Figure 7:
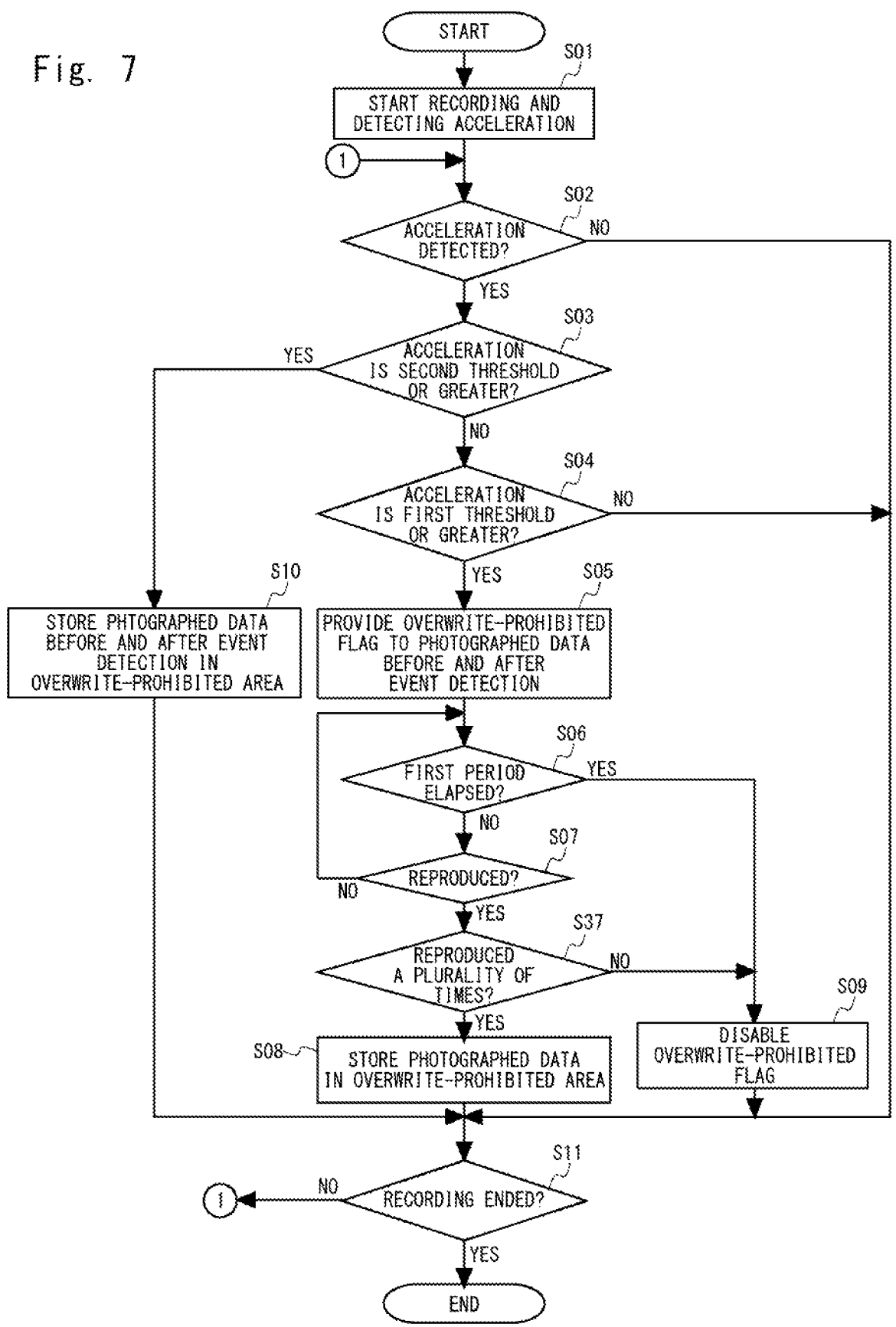
FIG. 7 is a flowchart showing a processing example of a recording apparatus according to a third embodiment of the present disclosure.

Next, a third embodiment of the present disclosure will be described with reference to FIG. 7. Since a configuration of a recording apparatus 10 according to the third embodiment is the same as that according to the first embodiment, description thereof is omitted. FIG. 6 shows processing in which Step S37 is added between Step S07 and Step S08 in FIG. 4. Since the processing other than the processing of Step S37 is the same as that of FIG. 4, the description of the same processing is omitted.

When it is determined in Step S07 that the first level event data has been reproduced (Step S07: Yes), the recording control unit 123 determines whether the first level event data reproduced in Step S07 is reproduced a plurality of times (Step S37).

The determination of plurality of times of reproduction made in Step S37 may be based on the condition that at least the event occurrence time is included in the reproduction and that a range of the first level event data that enables a confirmation of the state of the event is reproduced a plurality of times.

When it is determined in Step S37 that the first level event data is reproduced a plurality of times (Step S37: No), the process proceeds to Step S09. When it is determined in Step S37 that the first level event data is reproduced a plurality of times (Step S37: Yes), the process proceeds to Step S08.

In the third embodiment, when the first level event data is reproduced a plurality of times, the event data is highly important for the user, and is therefore stored in the write-protected area as the second level event data. By doing so, even event record data recorded as the first level event data is appropriately stored without being overwritten.

Figure 8:
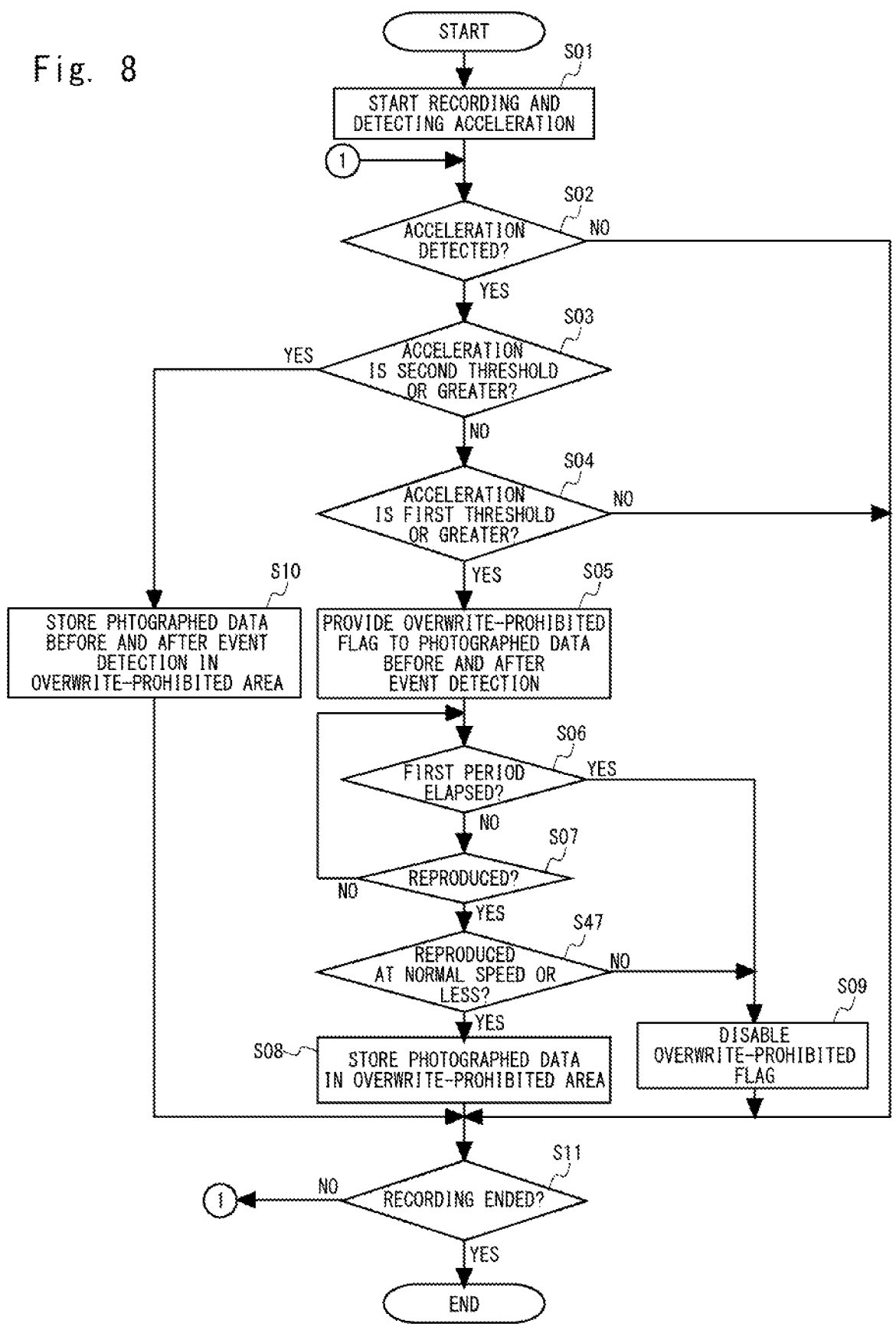
FIG. 8 is a flowchart showing a processing example of a recording apparatus according to a fourth embodiment of the present disclosure.

Next, a fourth embodiment of the present disclosure will be described with reference to FIG. 8. Since a configuration of a recording apparatus 10 according the fourth embodiment is the same as that according to the first embodiment, description thereof is omitted. FIG. 7 shows processing in which Step S47 is added between Step S07 and Step S08 in FIG. 4. Since the processing other than the processing of Step S47 is the same as that of FIG. 4, the description of the same processing is omitted.

When it is determined in Step S07 that the first level event data is reproduced (Step S07: Yes), the recording control unit 123 determines whether the first level event data reproduced in Step S07 is reproduced at a normal speed or less (Step S47).

The reproduction at the normal speed or less to be determined in Step S47 includes slow reproduction in addition to reproduction at a speed equivalent to the recorded speed of the first level event data. In Step S47, the determination that the reproduction is not at the normal speed or less means that the first level event data is fast-forwarded. The determination in Step S47 may be applied to a period including at least the event occurrence time and that enables a confirmation of the state of the event. Further, the determination in Step S47 may be made based on the condition that the first level event data is reproduced at the normal speed or less for a predetermined period, for example, the first level event data is reproduced at the normal speed or less for five seconds or longer.

When it is determined in Step S47 that the first level event data is not reproduced at the normal speed or less (Step S47: No), the process proceeds to Step S09. In Step S37, when the first level event data is reproduced at the normal speed or less (Step S47: Yes), the process proceeds to Step S08.

In the fourth embodiment, when the first level event data is reproduced at the normal speed or less, the event data is highly important for the user, and is therefore stored in the write-protected area as the second level event data. By doing so, even event record data recorded as the first level event data is appropriately stored without being overwritten.

Note that the present disclosure is not limited to the above-described embodiments, and can be modified as appropriate without departing from the spirit of the present disclosure. For example, in the processing of Step S06, the first period has been described as a fixed value such as 10 minutes, but the first period may be a period that varies depending on a condition. For example, the first level event data may be protected from being written in response to a first overwriting request and may not be protected from being written in response to a second overwriting request. The first period in this case varies depending on a capacity of a recording area of the recording unit 220 for recording write-unprotected photographed data, image quality of the photographed data, and so on. The respective embodiments may be carried out in any combination.

Further, the program for causing a computer to execute the above processing can be stored and provided to a computer operating as the recording apparatus using any type of non-transitory computer readable media.

Further, each element shown in the drawings as functional blocks that perform various processing can be formed of a CPU, a memory, and other circuits in hardware and may be implemented by programs loaded into the memory in software. Those skilled in the art will therefore understand that these functional blocks may be implemented in various ways by only hardware, only software, or the combination thereof without any limitation.

Furthermore, the above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Compact Disc-Read Only Memory), CD-R (CD-Recordable), CD-R/W (CD-ReWritable), and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present disclosure can be applied to a recording apparatus that appropriately records an accident of a moving body such as an automobile.

According to these embodiments, it is possible to appropriately store event data even for an accident with small acceleration.

What is claimed is:
1. A recording apparatus comprising:
a photographed data acquisition unit configured to acquire photographed data taken by a camera for photographing surroundings of a moving body;
an event detection unit configured to, when acceleration greater than or equal to a first threshold and less than a second threshold, the second threshold being greater than the first threshold, applied to the moving body is detected, determine that a first level event has occurred, while when acceleration greater than or equal to the second threshold is detected, determine that a second level event has occurred; and a recording control unit configured to, when an occurrence of the first level event is detected, store the photographed data resulting from the occurrence of the first level event data as first level event data, while when an occurrence of the second level event is detected, store the photographed data resulting from the occurrence of the second level event as second level event data, and when the first level event data is reproduced within a first period from the occurrence of the first level event, store the first level event data as the second level event data.

2. The recording apparatus according to claim 1, wherein when the first level event data is reproduced for a predetermined proportion or longer of a time length of the first level event data within the first period from the occurrence of the first level event, the recording control unit stores the first level event data as the second level event data.

3. The recording apparatus according to claim 1, wherein when the first level event data is reproduced a plurality of times within the first period from the occurrence of the first level event, the recording control unit stores the first level event data as the second level event data.

4. The recording apparatus according to claim 1, wherein when the first level event data is reproduced at a reproduction speed of less than or equal to a normal speed within the first period from the occurrence of the first level event, the recording control unit stores the first level event data as the second level event data.

5. The recording apparatus according to claim 1, wherein when the recording control unit stores the first level event data as write-protected data changeable into write-unprotected data, the recording control unit stores the second level event data as write-protected data, and the first period or longer has elapsed from the occurrence of the first level event, the recording control unit changes the first level event data from the write-protected data to the write-unprotected data.

6. The recording apparatus according to claim 1, wherein the recording control unit provides a write-protected flag to the first level event data and stores the first level event data provided with the write-protected flag, and the recording control unit stores the second level event data in a write-protected area.

7. The recording apparatus according to claim 1, wherein when the acceleration applied to the moving body in a horizontal direction is greater than or equal to the first threshold, the event detection unit determines that the first level event has occurred, while when the acceleration applied to the moving body in the horizontal direction or a vertical direction is greater than or equal to the second threshold, the event detection unit determines that the second level event has occurred.

8. A recording method comprising:

acquiring photographed data taken by a camera for photographing surroundings of a moving body;

determining, when acceleration greater than or equal to a first threshold and less than a second threshold, the second threshold being greater than the first threshold, applied to the moving body is detected, that a first level event has occurred, while when acceleration greater than or equal to the second threshold is detected, determining that a second level event has occurred; and storing, when an occurrence of the first level event is detected, the photographed data resulting from the occurrence of the first level event data as first level event data, while when an occurrence of the second level event is detected, storing the photographed data resulting from the occurrence of the second level event as second level event data, and when the first level event data is reproduced within a predetermined period from the occurrence of the first level event, storing the first level event data as the second level event data.

9. A non-transitory computer readable medium storing program for causing a computer operating as a recording apparatus to execute:

acquiring photographed data taken by a camera for photographing surroundings of a moving body;

determining, when acceleration greater than or equal to a first threshold and less than a second threshold, the second threshold being greater than the first threshold, applied to the moving body is detected, that a first level event has occurred, while when acceleration greater than or equal to the second threshold is detected, determining that a second level event has occurred; and storing, when an occurrence of the first level event is detected, the photographed data resulting from the occurrence of the first level event data as first level event data, while when an occurrence of the second level event is detected, storing the photographed data resulting from the occurrence of the second level event as second level event data, and when the first level event data is reproduced within a predetermined period from the occurrence of the first level event, storing the first level event data as the second level event data.

* * * * *